J. KOENIG.
BALL AND SOCKET PIPE JOINT.
APPLICATION FILED MAY 27, 1911.

1,007,362.

Patented Oct. 31, 1911.

Witnesses:
P. F. Nagle
H. F. Dieterich

Inventor.
Johann Koenig.
By Wiedersheim & Fairbanks,
Attorneys.

UNITED STATES PATENT OFFICE.

JOHANN KOENIG, OF RIGA, RUSSIA.

BALL-AND-SOCKET PIPE-JOINT.

1,007,362.  Specification of Letters Patent.  Patented Oct. 31, 1911.

Application filed May 27, 1911.  Serial No. 629,927.

*To all whom it may concern:*

Be it known that I, JOHANN KOENIG, engineer, a subject of the King of Bavaria, residing at No. 97 Alexanderstrasse, Riga, Russia, have invented new and useful Improvements in Ball-and-Socket Pipe-Joints, of which the following is a specification.

My invention relates to ball-and-socket pipe-joints of the kind described in my application for patent of September 24th, 1910, Serial Number 583540, and it consists in certain features of novelty which will appear from the following description and be particularly pointed out in the appended claim, reference being had to the accompanying drawing in which—

Figure 1:
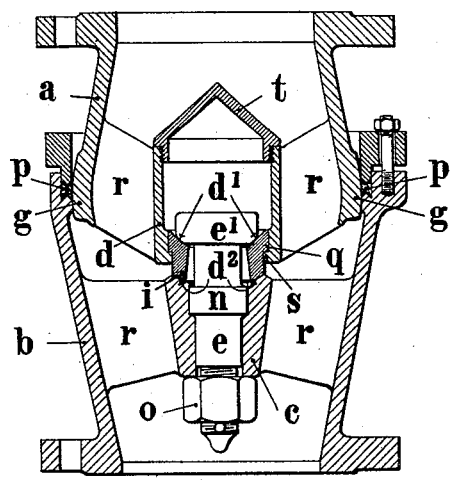
Figure 2:
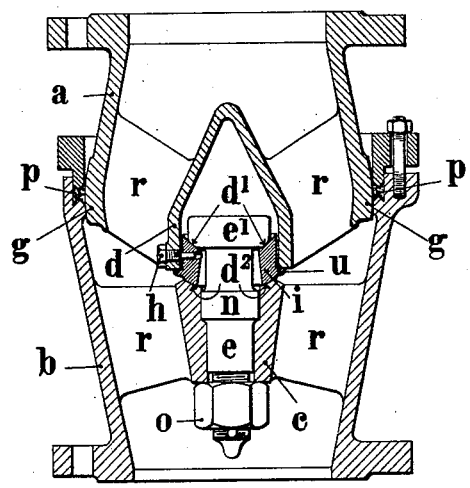

Figure 1 is a sectional view of a form of construction embodying my improvements, Fig. 2 a similar view, illustrating a slight modification.

As will be seen from the drawing, the pipe-joint comprises a tubular socket $a$, a similar tubular socket $b$, into which the socket $a$ fits in a well-known manner by means of a spherical portion $g$, and a bolt $e$ which connects the sockets $a$, $b$ with each other, this bolt being attached to hubs $d$, $c$, carried by ribs $r$ of the sockets $a$, $b$, respectively. The center of the spherical portion $g$ coincides with the center of the joint. Between the sockets a packing $p$ is provided.

The arrangement as thus far described is substantially the same as set forth in my said application, the novel features of the present invention being as follows.

Around the bolt $e$ a coupling sleeve $i$ is fitted which by means of a spherical depression $d^1$ bears against a head $e^1$ of the bolt $e$ and by means of a spherical edge $d^2$ rests upon a spherical depression of the hub $c$. The bolt $e$ is secured in its position within the hub $c$ by a collar $n$ and a nut $o$ screwed upon the end of the bolt opposite the head $e^1$ thereof.

With the form of construction shown in Fig. 1 the sleeve $i$ has a collar $q$ resting on an annular projection $s$ of the hub $d$, the latter having a removable cap $t$ that enables the sleeve $i$ as well as the bolt $e$ to be inserted therein. The collar $q$ and projection $s$ secure the connection of the sockets $a$, $b$. If it is desired to disconnect these the cap $t$ has to be removed and the nut $o$ to be unscrewed, as will readily be seen.

With the form of construction represented in Fig. 2 the sleeve $i$ is connected with the hub $d$ by a screw $h$ or the like and is fitted with an annular projection $u$ bearing against this hub. In this case the screw or the like $h$ forms the means securing the connection of the sockets $a$, $b$, as will be understood.

I claim:

In a ball-and-socket pipe-joint the combination with two tubular sockets, one of which fits into the other, of a hub mounted in the central axis of one of such sockets, a second hub mounted in the other socket coaxial with the former hub, a bolt carried by one of the said hubs, means securing this bolt against longitudinal displacement therein, a head provided on the said bolt, a sleeve fitted around the bolt and bearing with a spherical edge against a spherical depression of the hub carrying the bolt, such sleeve having a spherical depression for the said head to rest upon, and means securing the connection of the said sleeve with the other hub, substantially as specified.

In witness whereof I have hereunto signed my name this third day of May 1911, in the presence of two subscribing witnesses.

JOHANN KOENIG.

Witnesses:
 KONRAD CULL,
 RUDOLF LESCHINSKY.

---

Copies of this patent may be obtained for five cents each, by addressing the "Commissioner of Patents, Washington, D. C."